United States Patent [19]
Kosonen

[11] 3,886,064
[45] May 27, 1975

[54] LAMELLAR SEPARATOR

[75] Inventor: Pentti Einari Kosonen, Saltsjo-Boo, Sweden

[73] Assignee: AB Gustavsbergs Fabriker, Germany

[22] Filed: Oct. 17, 1972

[21] Appl. No.: 298,412

[30] Foreign Application Priority Data
Nov. 12, 1971 Sweden............................ 14546/71

[52] U.S. Cl. ................. 209/157; 210/519; 210/522
[51] Int. Cl......................... B03b 3/30; B01d 21/00
[58] Field of Search ...................... 209/157–161, 209/168; 210/521, 83, 84, 519, 522, 490, 494, 532; 61/18

[56] References Cited
UNITED STATES PATENTS
| | | | |
|---|---|---|---|
| 863,168 | 8/1907 | Griswold...................... | 210/521 X |
| 2,155,319 | 4/1939 | Livingston ......................... | 209/157 |
| 3,706,384 | 12/1972 | Weijman-Hane ............... | 210/522 X |
| 3,794,167 | 2/1974 | Olgard et al.......................... | 210/84 |

FOREIGN PATENTS OR APPLICATIONS
635,611  4/1950  United Kingdom................. 210/521

*Primary Examiner*—Frank W. Lutter
*Assistant Examiner*—Ralph J. Hill
*Attorney, Agent, or Firm*—Toren, McGeady and Stanger

[57] ABSTRACT

A lamellar separator provided with adjustable regulating plates, which are arranged in front of the outlet openings in order to insure a uniform distribution of the total flow between the separator channels to compensate a poor alignment of the separator.

1 Claim, 7 Drawing Figures

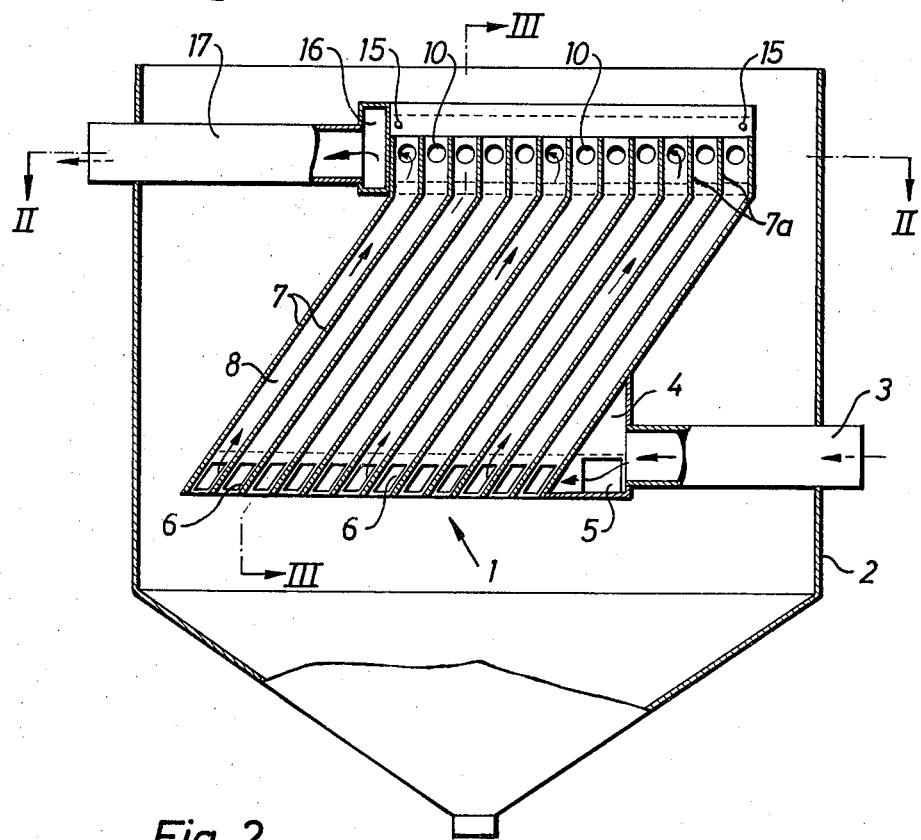
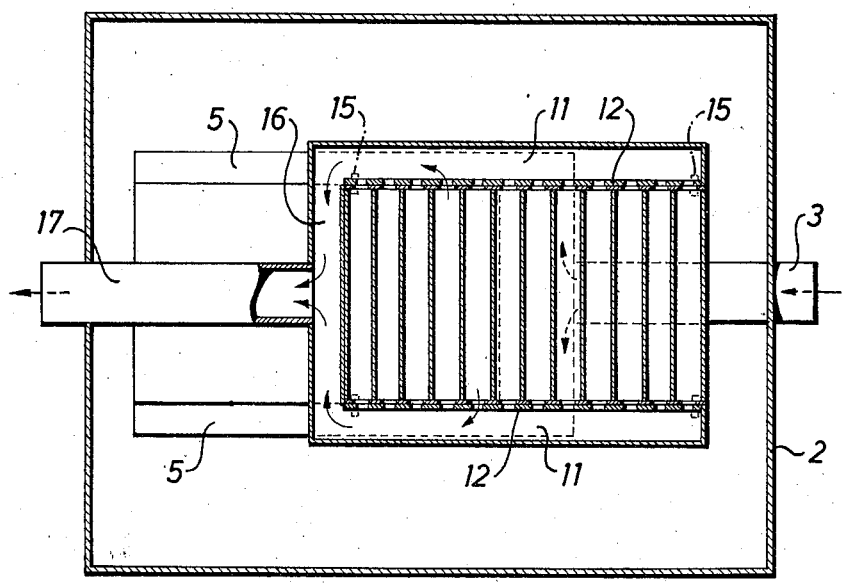

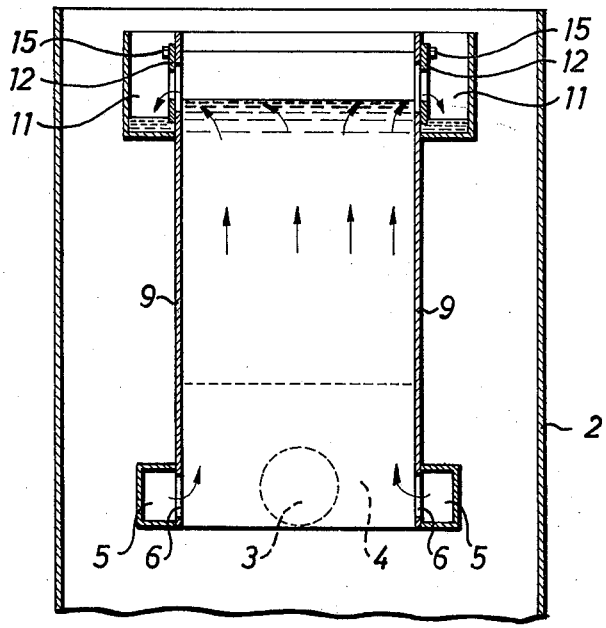
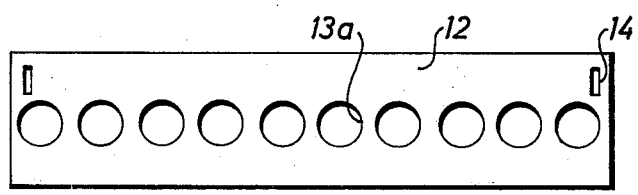
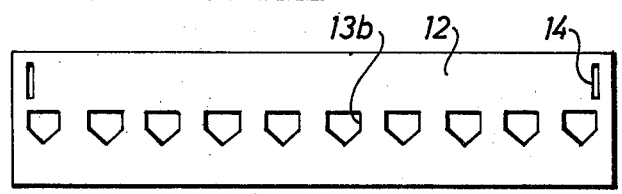
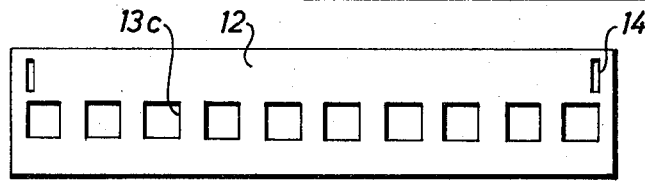
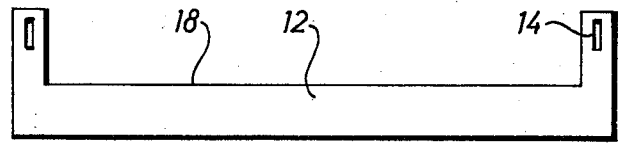

LAMELLAR SEPARATOR

The present invention relates to a lamellar separator comprising oblique lamellae which, together with the side walls of the separator, form channels at the lower part of which feeding channels are arranged and at the upper part of which outlet openings are arranged, said lamellar separator being intended to be built in to a sedimentation basin, for example in a sewage treatment plant, to separate light impurities, for example flocks.

Previously known lamellar separators were built as a unit for subsequent installation in a sedimentation basin. This installation is difficult to perform accurately in view of the alignment of the lamellar separator.

If the separator is placed askew in the longitudinal direction there is an uneven flow distribution between the channels and if it is placed askew in the transverse direction there is an asymmetrical flow distribution in each individual channel. The separation is strongly dependent on the flow through the separation channels since the flocks have a density which is negligibly greater than that of the water. The total flow through the separator must therefore be adjusted to the flow in the most heavily loaded channel or part of a channel, and the capacity of the separator is therefore considerably reduced.

Another disadvantage with known lamellar separators is that disturbances in the flow at the outlet of the separator, which may be caused by the increased rate of flow of the water at the outlet, may be transmitted downwardly in the lamellar channels and disturb the separation, with the result that the flow through the separator must be further reduced.

The problems and disadvantages mentioned above are eliminated according to the invention by means of a lamellar separator, which is characterized in that adjustable regulating plates are arranged in front of the outlet openings in order to ensure a uniform distribution of the total flow between the separator channels and a uniform circulation pattern in the indivudual channels to compensate a poor alignment of the separator.

The regulating plates are provided at both ends with large vertical slots through which attachment bolts extend so that the regulating plates can be adjusted with respect to their vertical position and angle in relation to the outlet openings.

The regulating plates comprise horizontal bars, the waste water running over the edge of the weirsill.

Alternatively, the regulating plates may consist of plates provided with outlet apertures facing the outlet openings, these apertures being circular, quadratic or having quadratic upper part and triangular lower part.

The upper part of the lamellar channels is vertically arranged in order to reduce the speed of the water in this part so that flow disturbances from the regulating plates are decreased and also to increase the width of the channels so that the outlet openings and the apertures in the regulating plates can be made as large as possible, thus giving increased capacity in the lamellar separator.

The invention will be further described in the following with reference to the accompanying drawings.

FIG. 1 shows a section through a lamellar separator installed in a sedimentation tank;

FIG. 2 is a section taken along the line II—II in FIG. 1; and

FIG. 3 is a section taken along the line III—III in FIG. 1;

FIGS. 4–7 show different embodiments of the regulating plates.

A lamellar separator which is generally designated 1 is installed in a sedimentation basin 2 and has an inlet pipe 3 which leads through the wall of the sedimentation basin to a distribution chamber 4 arranged at the lower part of the separator. Two feeding channels 5 extend from the distribution chamber 4 along the bottom of each side 9 of the lamellar separator. From each feeding channel 5 inlet openings 6 lead to the channels 8 formed between the lamellae 7. The lammelae 7 are placed obliquely in the sedimentation part, but are deflected to vertical extension through the outlet part of the separator.

Outlet openings 10 which open out into a trough 11 running along each side 9 of the separator are arranged in the upper ends of the channels 8 through the sides 9 of the separator.

An adjustable regulating plate 12 is arranged in the trough 11 in front of the row of outlet openings 10 in each side 9.

Spacious, elongated attachment apertures 14 are arranged vertically in the regulating plates 12 at each end so that the regulating plates can be adjustably fitted to the sides 9 of the separator by means of attachment bolts 15.

The regulating plates 12 are usually arranged so that the attachment bolts 15 pass through the upper part of the attachment apertures.

The regulating plates 12 are in the form of a "bar" (FIG. 7), the outlet water running over the edge of the weirsill 18. The regulating plates may alternatively have outlet openings 13a, 13b, 13c, as shown in FIGS. 4 – 6, which face the outlet openings 10 and are circular, quadratic or triangular with rectangular shape along one short side of the triangle, in order to satisfy different requirements in the outlet flow as a function of variations in the inlet flow.

The two collecting troughs 11 combine to form a common outlet channel 16 from which the cleaned liquid is removed through an outlet pipe 17 having its mouth outside the wall of the sedimentation chamber 2.

The lamellae 7 extend vertically at the upper part 7a so that the upper part of the channels 8 will be wider.

The channels 8 therefore have a lower flow rate towards the top and disturbances in the flow pattern which might considerably affect the sedimentation process and which are induced at the edges of the outlet apertures 13a, 13b, 13c, 18, are subdued in these enlarged parts of the channels.

Because of the vertical extension of the lamella sections 7a, the upper part of the channels 8 has greater width than the rest of the channels 8, thus permitting a wider selection for the design of the outlet openings of the regulating plates.

If the separator inclines laterally when it is installed, the channels will be unevenly loaded. This can be alleviated by parallel displacing one or both the regulating plates until their weirsills are the same distance from the water surface in the sedimentation basin.

If, during installation, it has been impossible to arrange the separator accurately horizontal in the longitudinal direction, the channels will be unevenly loaded. Furthermore, the channels may be unevenly loaded as a result of deviations in the water supply to the individual channels.

The adjustable regulating plates can then be placed at an angle to the separator so that all the channels will be equally and symmetrically loaded and the separator will therefore operate at optimal capacity.

The lamellar separator can thus be adjusted to a maximum capacity by placing the regulating plates according to the invention at an angle so that the flow is distributed uniformly between the individual channels and by parallel displacing them so that the flow pattern in the individual channels will be uniform.

What is claimed is:

1. Lamellar separator comprising a pair of upwardly extending laterally spaced side walls, a plurality of spaced upwardly oriented lamellae extending transversely between said side walls and forming, in combination with said side walls, a plurality of separator channels, said lamellae disposed obliquely to the horizontal, said side walls having first openings at their lower ends and second openings at their upper ends, said first openings forming inlet openings into each of said channels and said second openings forming outlet openings from each of said channels so that the flow passes upwardly therethrough, a sedimentation basin enclosing said side walls and lamellae and arranged in combination with said side walls and lamellae for separating light impurities such as flocks in a sewerage treatment plant, wherein the improvement comprises regulating plates positioned on said side walls in front of said outlet openings, said regulating plates being adjustable in the vertical direction to provide a uniform distribution of the total flow through said separator channels and to provide a uniform circulating pattern in the individual said channels to compensate for poor alignment of the separator, the upper ends of said lamellae extending vertically upwardly from the remaining portions extending obliquely to the horizontal for reducing the speed of the flow through the upper part of said separator channels so that flow disturbances from said regulating plates are decreased, said regulating plates having apertures therethrough arranged to be vertically adjustably aligned opposite said outlet opening in said side walls and the vertical arrangement of the upper ends of said lamellae increases the width of said separator channels so that said outlet openings in said side walls and said apertures in said regulating plates can be made as large as possible thus affording increased capacities in the lamellar separator.

* * * * *

UNITED STATES PATENT OFFICE
CERTIFICATE OF CORRECTION

PATENT NO. : 3886 064
DATED : May 27, 1975
INVENTOR(S) : PENTTI EINARI KOSONEN

It is certified that error appears in the above-identified patent and that said Letters Patent are hereby corrected as shown below:

In the heading of the patent, insert:

[73] --Assignee: AB GUSTAVSBERGS FABRIKER
Gustavsberg, Sweden

Signed and Sealed this twentieth Day of January 1976

[SEAL]

Attest:

RUTH C. MASON
*Attesting Officer*

C. MARSHALL DANN
*Commissioner of Patents and Trademarks*